United States Patent
Wang

(10) Patent No.: US 7,313,382 B2
(45) Date of Patent: Dec. 25, 2007

(54) METHOD FOR AUTOMATIC WIRELESS REPLENISHMENT USING DTMF

(75) Inventor: Mingheng Wang, Rochester Hills, MI (US)

(73) Assignee: General Motors Corporation, Detroit, MI (US)

( * ) Notice: Subject to any disclaimer, the term of this patent is extended or adjusted under 35 U.S.C. 154(b) by 1024 days.

(21) Appl. No.: 10/059,642

(22) Filed: Jan. 29, 2002

(65) Prior Publication Data

US 2003/0143976 A1    Jul. 31, 2003

(51) Int. Cl.
*H04M 11/00* (2006.01)
*H04M 15/00* (2006.01)
*B60R 25/10* (2006.01)

(52) U.S. Cl. ............... 455/405; 379/114.03; 340/426.2

(58) Field of Classification Search ............... 455/407, 455/406, 575.9, 405, 410, 408, 411; 340/426.2, 340/5.4, 5.41, 5.42; 705/38, 44; 379/114.03, 379/114.1, 114.15, 114.16, 114.17, 114.19, 379/114.2; 713/200
See application file for complete search history.

(56) References Cited

U.S. PATENT DOCUMENTS

| | | | | |
|---|---|---|---|---|
| 5,138,650 A | * | 8/1992 | Stahl et al. ................ 455/408 |
| 6,026,292 A | * | 2/2000 | Coppinger et al. ......... 455/406 |
| 2001/0034245 A1 | * | 10/2001 | Swartz ...................... 455/557 |
| 2002/0106993 A1 | * | 8/2002 | Shealtiel .................... 455/74.1 |
| 2002/0119800 A1 | * | 8/2002 | Jaggers et al. ............. 455/550 |
| 2002/0181398 A1 | * | 12/2002 | Szlam ......................... 370/230 |
| 2003/0096641 A1 | * | 5/2003 | Odinak ...................... 455/569 |
| 2003/0119478 A1 | * | 6/2003 | Nagy et al. ................ 455/408 |
| 2003/0157929 A1 | * | 8/2003 | Janssen et al. ............. 455/416 |

* cited by examiner

*Primary Examiner*—Naghmeh Mehrpour

(57) ABSTRACT

The invention provides a method for replenishing call-use authorization to a mobile vehicle. A call-use authorization request is received from a user. User credit availability information is determined. A replenishment amount request is received from the user. Call-use authorization data is updated based on the credit availability information and the replenishment amount request. The updated call-use authorization data is sent to an in-vehicle communication device by using a dual-tone multiple frequency protocol.

23 Claims, 2 Drawing Sheets

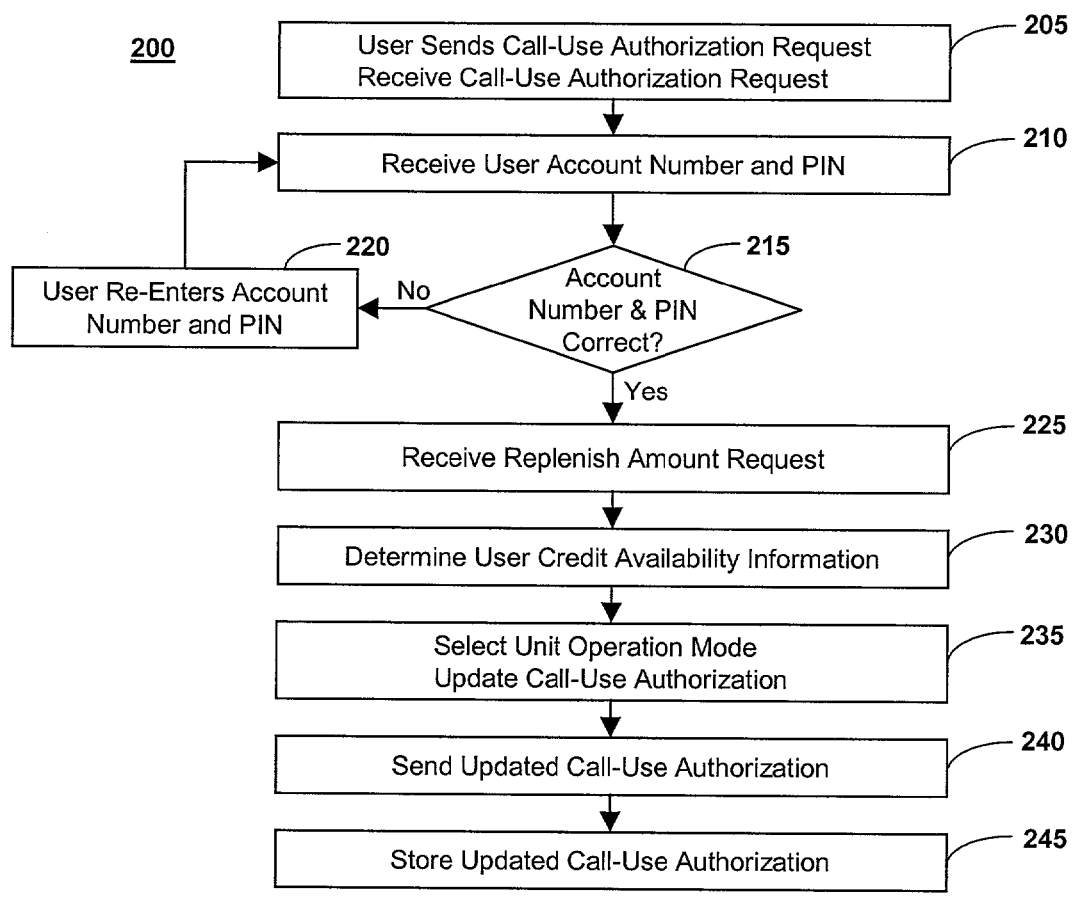

METHOD FOR AUTOMATIC WIRELESS REPLENISHMENT USING DTMF

FIELD OF THE INVENTION

This invention relates generally to a method for operating a wireless communication system. More specifically, the invention relates to a method for automated replenishment of calling time authorization to a mobile vehicle.

BACKGROUND OF THE INVENTION

In recent years, wireless communication services for automobiles and mobile phones have increased greatly in the variety and number, along with the concomitant demands on telematics service call centers. When a call center has too many incoming phone calls, it may not be able to process requests in a timely fashion. This process requires a large amount of dedicated resources including the time of human and virtual advisors, modem time, and additional software applications used by the advisors for processing requests. Requests may not be executed successfully or may need longer time to finish a process before the vehicle is shut off. An example of a subscriber request that may benefit from an increased level of automation is a user request for additional calling minutes to be ascribed to the in-vehicle phone.

Call centers commonly use a model of pre-payment for services to manage the airtime minutes that subscribers of telematic services use. Frequently, human advisors at call centers receive calls from users who wish to purchase additional personal call minutes. After an advisor has received a request for purchase, processed credit card information and authorized additional call minutes, the call center may replenish the call minutes for an in-vehicle phone by downloading new bundled units information through data communications based on standard modem connections.

Unfortunately, this method may use much of call center resources, particularly the time of a human advisor and time of modem use. As the requests to a call center increase, the call center may be unable to process all the wireless phone replenishment requests successfully or it may need longer time to finish the process. Customers may be put on hold and service may be delayed.

It would be beneficial to have an alternative approach to replenishing call minutes of an in-vehicle phone when advisor or hardware resources are limited. Ideally, this mechanism would be as effective as and perhaps more efficient than the current processing of call-use replenishment requests. An improved replenishment method would allow the user to call from any dial-tone phone and ease the strain on the call center by avoiding the need for a human advisor or modem. It would also allow the newly purchased call minutes to be downloaded to an in-vehicle phone in more than one manner. The method would avoid the need to queue or deny the request based on the unavailability of modem lines and advisors, simplify the personal calling replenishment process, and increase the quality of service of the call center.

It is an object of this invention, therefore, to provide a method for replenishing call-use authorization to a mobile vehicle, and to overcome the deficiencies and obstacles described above.

SUMMARY OF THE INVENTION

One aspect of the invention provides a method for replenishing call-use authorization to a mobile vehicle. A call-use authorization request may be received from a user. User credit availability information may be determined. A replenishment amount request may be received from the user. Call-use authorization data may be updated based on the credit availability information and the replenishment amount request. The updated call-use authorization data may be sent to an in-vehicle communication device by using a dual-tone multiple frequency protocol.

A user account number and a personalized identification number may be received and the user may be authenticated. The call-use authorization request may be received by using an interactive voice response application. The call-use authorization request may be received by using a dual-tone multiple frequency protocol.

The replenishment amount request may be received by using an interactive voice response application. The replenishment amount request may be received by using a dual-tone multiple frequency protocol.

The updated call-use authorization data may comprise a unit operation mode, a bundle of units, and an expiration date associated with the bundle of units. The unit operation mode may be selected from a group consisting of a unit add mode, a unit clear mode, and a unit subtract mode.

The updated call-use authorization data may be sent to an in-vehicle communication device when the vehicle is in a sleeping mode. The updated call-use authorization data may be stored in the in-vehicle communication device.

Another aspect of this invention provides a computer usable medium including a program for replenishing call-use authorization to a mobile vehicle. The program may include computer program code to receive a call authorization request from a user; computer program code to determine user credit availability information; computer program code to receive a replenishment amount request from the user; computer program code to update call-use authorization data based on the credit availability information and the replenishment amount request; and computer program code to send the updated call-use authorization data to an in-vehicle communication device by a dual-tone multiple frequency protocol.

The computer program may include code to receive a user account number and a personalized identification number, and to authenticate the user. The program may include code to receive the call-use authorization request by using a dual-tone multiple frequency protocol. The computer program may include code to receive the replenishment amount request by using a dual-tone multiple frequency protocol.

The computer program may include code for the updated call-use authorization data, which may comprise a unit operation mode, a bundle of units, and an expiration date associated with the bundle of units.

The computer program may include code to send the updated call-use authorization data to an in-vehicle communication device when the vehicle is in a sleeping mode. The computer program may include code to store the updated call-use authorization data in the in-vehicle communication device.

Another aspect of the invention provides a system for replenishing call-use authorization to a mobile vehicle including a means for receiving a call authorization request from a user; a means for determining user credit availability information; a means for receiving a replenishment amount request from the user; a means for updating call-use authorization data based on the credit availability information and the replenishment amount request; and a means for sending the updated call-use authorization data to an in-vehicle communication device by a dual-tone multiple frequency protocol.

The system may include a means for receiving a user account number and a personalized identification number, and a means for authenticating the user. The system also may include a means for storing the updated call-use authorization data in the in-vehicle communication device.

The aforementioned, and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

FIG. 2 is a flow diagram of one embodiment of a method for automatically replenishing calling time authorization for a mobile vehicle using DTMF, in accordance with the current invention.

DETAILED DESCRIPTION OF THE PRESENTLY PREFERRED EMBODIMENTS

Figure 1:
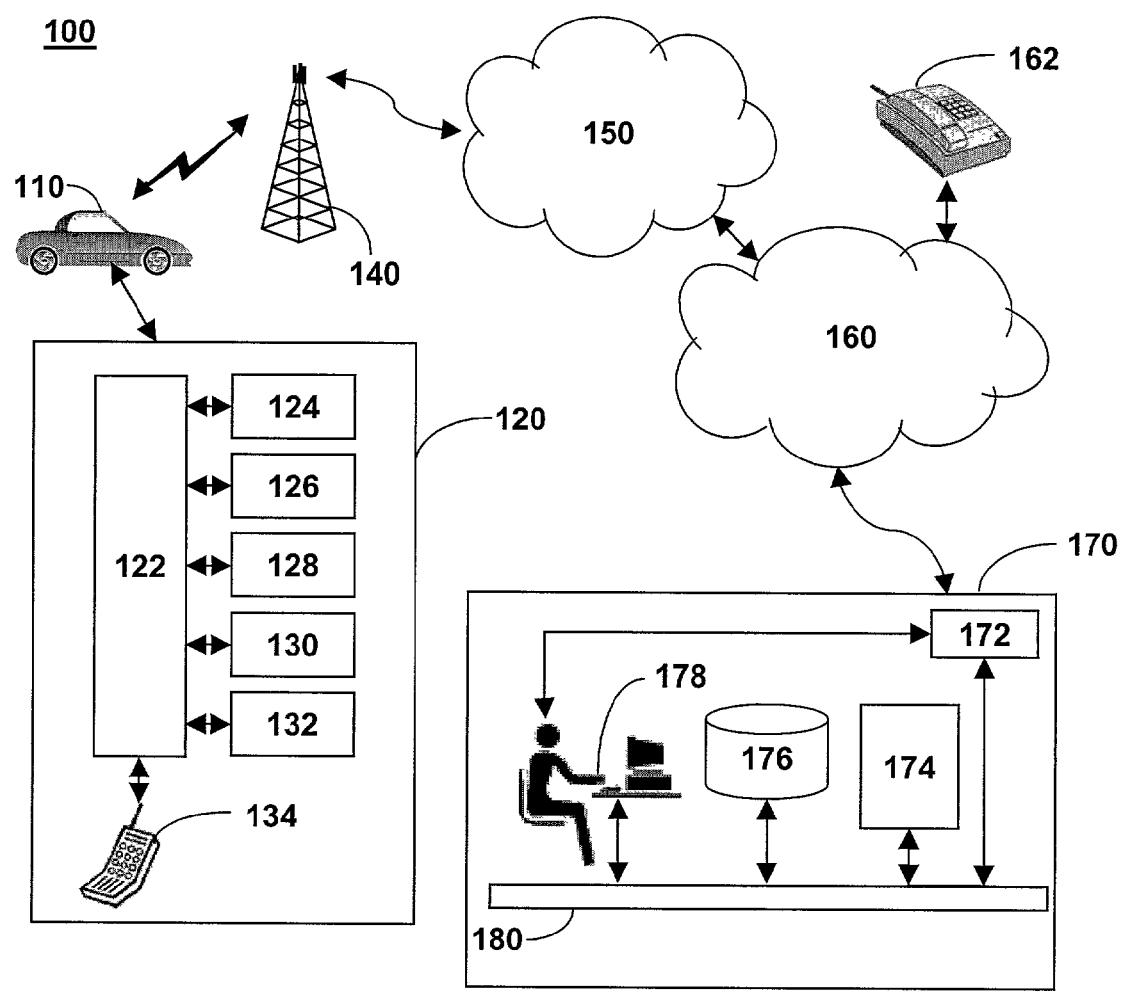
FIG. 1 is an illustration of one embodiment of a system for automatically replenishing calling time authorization for a mobile vehicle using DTMF, in accordance with the current invention.

FIG. 1 shows an illustration of one embodiment of a system for automatically replenishing calling time or call-use authorization for a mobile vehicle using dual-tone multiple frequency (DTMF) or interactive voice response, in accordance with the present invention at 100.

Mobile vehicle calling-time replenishment system 100 may include a mobile vehicle 110, a telematics unit 120, one or more wireless carrier systems 140, one or more communication networks 150, one or more land networks 160, and one or more call centers 170.

Mobile vehicle 110 may be a mobile vehicle equipped with suitable hardware and software for transmitting and receiving voice and data communications. Mobile vehicle 110 may contain telematics unit 120 that may include a vehicle communications processor. Telematics unit 120 may include a digital signal processor (DSP) 122 connected to a wireless modem 124, a global positioning system (GPS) unit 126, an in-vehicle memory 128, a microphone 130, one or more speakers 132, and a network access device (NAD) or in-vehicle mobile phone 134. In-vehicle mobile phone 134 may be an analog, digital, or dual-mode cellular phone. GPS unit 126 may provide longitude and latitude coordinates of the vehicle.

DSP 122 may execute various computer programs that control programming and operational modes of various systems within mobile vehicle 110. A voice-recognition application may be installed in DSP 122 and may translate human voice input through microphone 130 to digital signals. These signals may activate the programming mode and operation modes, as well as provide input data. Signals from DSP 122 may be translated into voice messages and sent out through speaker 132.

Mobile vehicle 110 via telematics unit 120 may send and receive radio transmissions from wireless carrier system 140. Wireless carrier system 140 may be any suitable system for transmitting a signal from mobile vehicle 110 to communication network 150.

Communication network 150 may comprise services from one or more mobile telephone switching offices and wireless networks. Communication network 150 may connect wireless carrier system 140 to land network 160. Communication network 150 may be any suitable system or collection of systems for connecting wireless carrier system 140 to mobile vehicle 110 and land network 160.

Land network 160 may be a public-switched telephone network. Land network 160 may be an Internet protocol (IP) network. Land network 160 may be comprised of a wired network, an optical network, a fiber network, another wireless network, or any combination thereof. Land network 160 may be connected to one or more land-line telephones 162. Land network 160 may connect communication network 150 to call center 170. Communication network 150 and land network 160 may connect wireless carrier system 140 to a communication node or call center 170.

Call center 170 may contain one or more voice and data switches 172, one or more communication services managers 174, one or more communication services databases 176, one or more communication services advisors 178, and one or more bus systems 180.

Call center 170 may be a location where many calls may be received and serviced at the same time, or where many calls may be sent at the same time. The call center may be a telematics call center, prescribing communications to and from telematics unit 120 in mobile vehicle 110. The call center may be a voice call center, providing verbal communications between an advisor in the call center and a subscriber in a mobile vehicle. The call center may contain each of these functions.

Call center 170 may contain one or more voice and data switches 172. Switch 172 may be connected to land network 160. Switch 172 may transmit voice or data transmissions from call center 170. Switch 172 also may receive voice or data transmissions from telematics unit 120 in mobile vehicle 110 through wireless carrier system 140, communication network 150, and land network 160. Switch 172 may receive from or send to one or more communication services managers 174 data transmissions via one or more bus systems 180. Communication services manager 174 may be any suitable hardware and software capable of providing requested communication services to telematics unit 120 in mobile vehicle 110. Communication services manager 174 may send to or receive from one or more communication services databases 176 data transmissions via bus system 180. Communication services manager 174 may send to or receive from one or more communication services advisors 178 data transmissions via bus system 180. Communication services database 176 may send to or receive from communication services advisor 178 data transmissions via bus system 180. Communication services advisor 178 may receive from or send to switch 172 voice or data transmissions.

Communication services manager 174 may provide one or more of a variety of services, including enrollment services, navigation assistance, directory assistance, roadside assistance, business or residential assistance, information services assistance, emergency assistance, and communications assistance. Communication services manager 174 may transmit data to telematics unit 120 in mobile vehicle 110 through wireless carrier system 140, communication network 150, land network 160, voice and data switch 172, and bus system 180. Communication services manager 174 may store or retrieve data and information from communication services database 176. Communication services manager 174 may provide requested information to communication services advisor 178.

Communication services advisor 178 may be a real advisor or a virtual advisor. A real advisor may be a human being in verbal communication with a user or subscriber in mobile vehicle 110 via telematics unit 120. A virtual advisor may be a synthesized voice interface responding to requests from telematics unit 120 in mobile vehicle 110.

Communication services advisor 178 may provide services to telematics unit 120 in mobile vehicle 110. Services provided by communication services advisor 178 may include enrollment services, navigation assistance, directory assistance, roadside assistance, business or residential assistance, information services assistance, emergency assistance, and communications assistance. Communication services advisor 178 may communicate with telematics unit 120 in mobile vehicle 110 through wireless carrier system 140, communication network 150, and land network 160 using voice transmissions, or through communication services manager 174 and switch 172 using data transmissions. Switch 172 may select between voice transmissions and data transmissions.

Traditionally, telematics unit 120 in mobile vehicle 110 will initiate a call-use replenishment authorization request to call center 170 via wireless modem 124, wireless carrier system 140, communication network 150, and land network 160. One embodiment of the present invention provides an alternative where mobile phone 134 without use of wireless modem 124 may initiate a call-use replenishment authorization request to call center 170 via wireless carrier system 140, communication network 150, and land network 160. Another embodiment of the present invention provides an alternative where land-line phone 162 or a cellular phone other than mobile phone 134 may initiate a call-use replenishment authorization request to call center 170 via land network 160.

In either case, a touch-tone phone may send and receive dual-tone multiple frequency signals that relay information pertinent to replenishing activation minutes or units for personal calls made from mobile phone 134 of in-vehicle telematics unit 120. The DTMF system, the International Telecommunications Union (ITU) Q.23/Q.24 and Bellcore signaling standards for telephone handset push-button keypads, may assign each phone key two specific frequencies or tones so that a digital signal processor can identify any pressed key. DTMF may allow for automated communication with the call center by way of menu-driven options and without the aid of a human advisor. The user also may use any mobile phone 134 or land-line-phone 162 to replenish activation minutes via interactive voice response and voice recognition software applications at call center 170. The menu-driven options of the voice and key commands may be similar, the difference being that the user speaks out an option number rather than presses a phone key corresponding to that number.

FIG. 2 shows a flow diagram of one embodiment of a method for automatically replenishing calling time authorization for a mobile vehicle using DTMF or interactive voice response, in accordance with the present invention at 200. Calling-time replenishment activation method 200 comprises steps to receive requests at a telematics call center to authorize call use and to replenish call-use authorization of a phone in a mobile vehicle.

A mobile phone user may call a call center from a mobile or land-line phone to request call-use authorization for an in-vehicle phone, (Block 205). The user may want, for example, to purchase additional minutes or units of call time for the in-vehicle phone. The additional units may be used, for example, to make personal calls from mobile vehicle 110.

The user may have set up an account previously by calling the call center and giving personal information such as name, address, telephone number, vehicle identification number, credit card name, credit card number, and credit card expiration date. The user may have received an account number and PIN to expedite future purchases of calling minutes or replenishment of call-use activation. The call center may have stored personal information in a database that would be accessed during future calls requesting call-use authorization.

The call-use authorization request and other steps in this calling-time replenishment activation method may be received from the user by using a DTMF protocol or an interactive voice response application. The call center then may send a message prompting the user to input a user account number and a personal identification number (PIN).

The call center may receive the user account number and PIN, (Block 210). The call center may check its records or database to see if the entered account number and PIN are correct, thereby authenticating the user, (Block 215). When the account number and PIN are not correct, the user may be prompted to reenter the numbers. The user may reenter the account number and PIN via a DTMF or an interactive voice response system, (Block 220), which the call center may receive, (Block 210).

The call center may receive from the user a request for a replenishment of available call minutes for the in-vehicle phone, (Block 225). The replenishment amount request may be transmitted by a DTMF protocol or an interactive voice response application. The request, for example, may be for a certain dollar amount with a corresponding number of calling units, or for a bundle of units such as 500 minutes or units of calling time.

The calling center may determine user credit availability information, (Block 230). For example, the call center may query a credit card company found in the record of the user as to the credit availability and credit limit of the user. For example, the call center may query its database for records of previous authorization requests and records of payments. For example, the call center may refer to records on a particular purchase program in which the user is enrolled, such as discount programs for certain organizations or individuals.

The call center may select a unit operation mode that corresponds to the replenishment request to add, clear or subtract calling units, (Block 235). The unit add mode may be used to add additional calling time units to the mobile vehicle. The unit clear mode may be used to reset the number of authorized call minutes in the mobile vehicle to zero when, for example, the vehicle is sold. The unit subtract mode may be used, for example, to correct or transfer call units.

The call-use authorization data may be sent to the mobile vehicle including the unit operation mode to add, clear, or subtract calling units; information on the purchased bundle of calling units; and an expiration date associated with the bundle of units, (Block 240). The information may be stored in the in-vehicle memory of the telematics unit, (Block 245).

The updated call-use authorization data may be sent to the mobile vehicle using a wireless call connection and a DTMF transmission to the in-vehicle phone, which may transfer the dual-tone frequency signals to the DSP of the telematics unit for processing. When the call authorization request originates from the in-vehicle phone, the updated call-use authorization data may be sent back to the telematics unit through the same phone connection by using the DTMF protocol. The updated call-use authorization data also may be received at the telematics unit using an interactive voice application that translates voice input to digitized data for processing by the DSP in the telematics unit.

Alternatively, the authorization data may be sent from the call center to the telematics unit of the mobile vehicle using a short messaging service of a wireless carrier, and stored by the DSP in the in-vehicle memory. The updated call-use authorization data may be received through the modem and processed in the DSP of the telematics unit by using a discontinuous receive (DRx) mode or sleeping mode. A vehicle communication device that is placed into a DRx or sleeping mode may be periodically awakened to a service-ready mode when it is able to receive a short message service (SMS) communication such as the updated call-use authorization data.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

The invention claimed is:

1. A method for replenishing call-use authorization to a mobile vehicle, comprising:
   receiving a call-use authorization request from a user;
   determining user credit availability information;
   receiving a replenishment amount request from the user;
   selecting a unit operation mode from a plurality of unit operation modes, the selected unit operation mode corresponding to the replenishment amount request;
   updating call-use authorization data based on the credit availability information and the replenishment amount request; and
   sending the updated call-use authorization data to an in-vehicle communication device by using a dual-tone multiple frequency protocol.

2. The method of claim 1 further comprising:
   receiving a user account number and a personalized identification number; and
   authenticating the user.

3. The method of claim 1 wherein the call-use authorization request is received by using an interactive voice response application.

4. The method of claim 1 wherein the call-use authorization request is received by using a dual-tone multiple frequency protocol.

5. The method of claim 1 wherein the replenishment amount request is received by using an interactive voice response application.

6. The method of claim 1 wherein the replenishment amount request is received by using a dual-tone multiple frequency protocol.

7. The method of claim 1 wherein the updated call-use authorization data comprises the selected unit operation mode, a bundle of units, and an expiration date associated with the bundle of units.

8. The method of claim 1 wherein the plurality of unit operation modes includes a unit add mode, a unit clear mode, and a unit subtract mode.

9. A method for replenishing call-use authorization to a mobile vehicle, comprising:
   receiving a call-use authorization request from a user;
   determining user credit availability information;
   receiving a replenishment amount request from the user;
   updating call-use authorization data based on the credit availability information and the replenishment amount request; and
   sending the updated call-use authorization data to an in-vehicle communication device by using a dual-tone multiple frequency protocol;
   wherein the updated call-use authorization data is sent to an in-vehicle communication device when the vehicle is in a sleeping mode.

10. The method of claim 1 further comprising:
    storing the updated call-use authorization data in the in-vehicle communication device.

11. A computer usable medium including a program for replenishing call-use authorization to a mobile vehicle comprising:
    computer program code to receive a call authorization request from a user;
    computer program code to determine user credit availability information;
    computer program code to receive a replenishment amount request from the user;
    computer program code to select a unit operation mode from a plurality of unit operation modes, the selected unit operation mode corresponding to the replenishment amount request;
    computer program code to update call-use authorization data based on the credit availability information and the replenishment amount request; and
    computer program code to send the updated call-use authorization data to an in-vehicle communication device by a dual-tone multiple frequency protocol.

12. The computer usable medium of claim 11 further comprising:
    computer program code to receive a user account number and a personalized identification number; and
    computer program code to authenticate the user.

13. The computer usable medium of claim 11 wherein the call-use authorization request is received by using a dual-tone multiple frequency protocol.

14. The computer usable medium of claim 11 wherein the replenishment amount request is received by using a dual-tone multiple frequency protocol.

15. The computer usable medium of claim 11 wherein the updated call-use authorization data comprises the selected unit operation mode, a bundle of units, and an expiration date associated with the bundle of units.

16. A computer usable medium including a program for replenishing call-use authorization to a mobile vehicle comprising:
    computer program code to receive a call authorization request from a user;
    computer program code to determine user credit availability information;
    computer program code to receive a replenishment amount request from the user;
    computer program code to update call-use authorization data based on the credit availability information and the replenishment amount request; and
    computer program code to send the updated call-use authorization data to an in-vehicle communication device by a dual-tone multiple frequency protocol;
    wherein the updated call-use authorization data is sent to an in-vehicle communication device when the vehicle is in a sleeping mode.

17. The computer usable medium of claim 11 further comprising:

computer program code to store the updated call-use authorization data in the in-vehicle communication device.

18. A system for replenishing call-use authorization to a mobile vehicle, comprising:

means for receiving a call authorization request from a user;

means for determining user credit availability information;

means for receiving a replenishment amount request from the user;

means for selecting a unit operation mode from a plurality of unit operation modes, the selected unit operation mode corresponding to the replenishment amount request;

means for updating call-use authorization data based on the credit availability information and the replenishment amount request; and means for sending the updated call-use authorization data to an in-vehicle communication device by a dual-tone multiple frequency protocol.

19. The system of claim 18 further comprising:

means for receiving a user account number and a personalized identification number; and means for authenticating the user.

20. The system of claim 18 further comprising:

means for storing the updated call-use authorization data in the in-vehicle communication device.

21. The method of claim 1 wherein the selected unit operation mode is a unit clear mode used to reset a number of authorized call minutes in the mobile vehicle to zero.

22. The method of claim 1 wherein the selected unit operation mode is a unit subtract mode used to correct or transfer call units.

23. The system of claim 18 wherein the plurality of unit operation modes include a unit add mode, a unit clear mode and a unit subtract mode.

* * * * *